March 7, 1972    K. J. CLEEREMAN    3,647,614
IMPACT MOLDED ARTICLE
Original Filed Feb. 13, 1967

INVENTOR.
Kenneth J. Cleereman
BY
Burke M. Halldorson
Attorneys

… … …

3,647,614
IMPACT MOLDED ARTICLE

Kenneth J. Cleereman, Midland, Mich., assignor to The Dow Chemical Company, Midland, Mich.
Application Feb. 13, 1967, Ser. No. 615,535, now Patent No. 3,488,747, dated Jan. 6, 1970, which is a continuation-in-part of application Ser. No. 384,641, July 23, 1964. Divided and this application Dec. 29, 1969, Ser. No. 1,935
Int. Cl. B29c 3/00; B32b 5/14
U.S. Cl. 161—166          3 Claims

ABSTRACT OF THE DISCLOSURE

Articles of unique structural properties are manufactured by impact molding a plurality of multiphase thermoplastic slugs, said slugs being flattened by impact force and spread out in interleafed fashion to form the walls of the article.

---

This application is a divisional application of my copending application Ser. No. 615,535, filed Feb. 13, 1967, and now U.S. Pat. 3,488,747, which is a continuation-in-part application of my application Ser. No. 384,641, filed July 23, 1964, and now abandoned.

This invention relates to improved methods for molding multiphase plastic articles having improved physical properties. By "multiphase" is meant plastic of more than one polymeric variety but in discrete layer form or plastic with filler, particularly fiber, therein.

Two methods are presently used to mold fiber filled plastic articles. In one, fibers and plastic are co-mixed and then pelletized. The pellets are subsequently used as feed stock in a ram or screw injection molding machine. In the other, fibers are cut from roving and starve-fed continuously from a hopper onto the screw of a screw injection molding machine while plastic or polymer is also fed simultaneously onto the same screw. A ram injection molding machine cannot be used, because the fiber-polymer feed is poorly mixed and will therefore be non-uniform in the product. The starve feeding of the screw injection machine causes both the fiber and the polymer to be mixed in the same ratio as fed.

While both of these methods are relatively simple, the major drawback is that whenever fibers are put through a screw extruder or a mixing heating cylinder, they are subjected to high shear and will break into many smaller parts. Under severe conditions, the fibers will emerge as a fine powder. This is undesirable since the strength of a fiber filled composite is dependent largely on the fiber length and the adhesion between the fibers and the polymer. With poor adhesion, the fibers must be longer in order to obtain load transfer between the two components. Even with good adherence, such as that obtained between epoxy and fiber glass, a fiber length less than ¼ inch is undesirable since the strength rapidly decreases. In low adhering systems, such as polystyrene and fiber glass, it would be particularly desirable to have a technique whereby fiber length is retained.

A corollary situation exists with respect to plural layered plastic, each layer comprising a different polymer. Such can be used to achieve a special property in an article. For example, if a thin layer of polyvinylidene chloride is used with another polymer layer, a decrease in gas or water permeability in the article formed can be effected. If a layer of styrene-acrylonitrile copolymer is used with another plastic, improved high tensile strength will result. A layer of foamed plastic will increase modulus without increase in weight. Layers of other plastic may also be used to effect other properties. In such instances, it is important to avoid thorough intermixing or shear of the individual layers whereby the effect of each is obliterated. The present invention provides a method whereby such can be accomplished.

Accordingly, an object of this invention is to provide an improved method for molding multiphase plastic.

Another object is to provide a method of the above character wherein articles having improved physical properties can be made.

Still another object is to provide a method of the above character wherein multi-axial orientation can be imparted to the molecules of the articles being molded.

A further object is to provide an impact molded article which has the combined desirable features of multiphase plastic and high multidirectional strength due to a unique orientation of the molecules of the several varieties of plastic and of the fill, if present.

A still further object is to provide apparatus which is capable of molding said article.

Another object is to provide apparatus, of the above character, which is capable of high speed, economical operation.

Other objects of the invention will in part be obvious and will in part appear hereinafter.

In accordance with the above objectives, feed in the form of slugs of multiphase plastic are impact molded to form an article. The molding technique preferably utilized involves rotating one element of the impact mold either during and for a short length of time after or solely after completion of the impact stroke. In the first instance, the rotation is continued past the point where the final mold cavity, that is, the cavity at the completion of the impact stroke, is completely filled with the plastic. In the second instance, rotation occurs only after the cavity is filled. In this way, a strain is placed upon the molecules of the plastic through the wall of the article being molded. The strain is multidirectional. When the material solidifies, the strain is frozen in. Rotation, after the impact stroke, can be determined by the use of a fill point determination apparatus or by applying a torque to the rotating element of the impact rotational mold which permits rotation after the mold cavity is filled, but is insufficient to overcome the resistant forces generated by the plastic, and the filler, if any, when the plastic reaches its second order transition point (the point of solidification). The amount of torque should be sufficient to cause rotation of the rotatable element for a short time after the mold is filled, but insufficient to damage or prevent solidification of the molded article after the impact stroke. The rotation may be during or after filling of the cavity.

The slugs of filled plastic can be prepared by arranging sheets of plastic and fiber or filler in layers and then adhering the layers to one another by the use of adhesive or by the use of a compression above the softening point of the plastic. Alternatively, fine plastic powder or pellets and fiber or fill are co-fed into a compression mold, then heated slightly above the softening point of the plastic, and compressed.

In each of the above, the fibers or fill may be either randomly arrayed or oriented in a specific direction. Also the fiber length or the fill size can be carefully controlled since the fibers can be cut to any desired length or the fill can be sieved and since the compression step generates or causes very little, if any, shearing thereafter.

With plastic of more than one polymeric variety, co-extrusion into a single thick sheet is utilized. Alternatively, individual sheets of different materials can be stacked atop one another and bonded together using heat, a combination of heat and pressure, or an adhesive. If the sheets are not mutually adhesive to each other, an adhesive layer may be stacked or extruded between the sheets. Round, hexagonal and various other geometric shapes and configurations are then stamped out of the multiphase sheet with filler, if any, to provide the slugs.

The invention accordingly comprises the several steps and the relation of one or more of such steps with respect to each of the others, and the article which possesses the characteristics, properties and relation of elements, all as exemplified in the detailed disclosure hereinafter set forth, and the scope of the invention will be indicated in the claims.

For a fuller understanding of the nature and objects of the invention, reference should be had to the following detailed description taken in connection with the accompanying drawing in which.

Similar reference characters refer to similar parts throughout the several views of the drawing.

Figure 2:
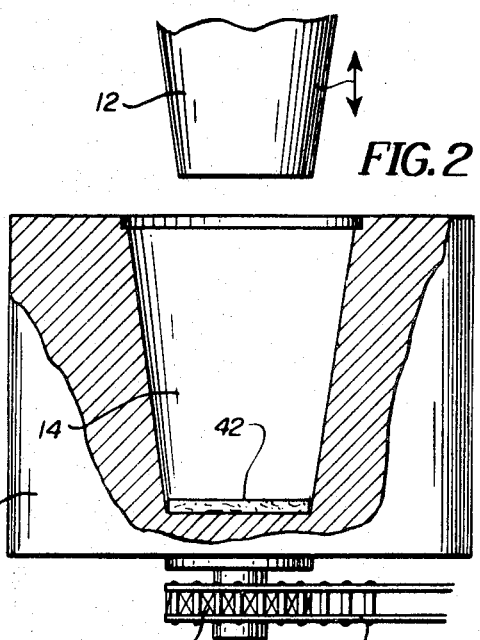
FIG. 2 is a side view, partly in section, illustrating one embodiment of apparatus which can accomplish the method of this invention, as it would appear prior to the impact stroke.
Figure 3:
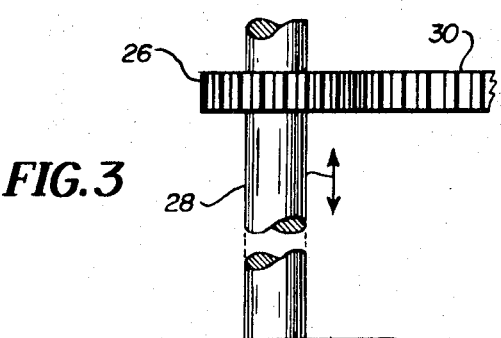
FIG. 3 is a side view, partly in section, of a second embodiment of apparatus which can accomplish the method of this invention, as it would appear on completion of the impact stroke.

As seen in FIGS. 2 and 3, the apparatus, in its barest form, comprises a mold block 10 with a mold cavity 14 therein of the desired configuration. A die 12 reciprocates into and out of the mold cavity 14 with a pressure sufficient to cause impact molding of the plastic. When the apparatus is used in the manner whereby one element is rotated as described above, a unique property in the molded article is effected as will be described. It should be noted that reference to "rotation" herein includes complete or partial rotation and even oscillation of the rotatable mold element.

Reference is now made to specific examples which illustrate the invention in greater detail.

EXAMPLE I

A slug is prepared having an outer dimension equal to the smallest inner dimension of the cup being formed. The slug is prepared by layering a plurality of sheets of polystyrene and a sheet of non-woven parallel arrays of fiber glass of ¼ inch length, softening the plastic and then stamping the slug from the sheet.

After formation, the slug is again softened at 250° F. and deposited into the female block of an impact mold, such as shown in FIG. 2. The male die is then pounded into the female block to cause exuding of the polystyrene upwardly around the male die to form a cup. The female die is rotated during and for a short length of time after completion of the impact stroke. Upon cooling, the polystyrene retains the shape of the cavity between the male and female mold elements and the strain is frozen in. The amount of torque used should be insufficient to damage the impact molded article, or to prevent solidification of the polystyrene after the impact stroke; that is, it should not be so great that the polystyrene will not harden. And since the slug is only slightly above the softening temperature of the polystyrene, the latter's viscosity is high. The fibers are therefore carried with the polystyrene so that they will be aligned helical to the flow of the polystyrene during the impact stroke.

After opening of the impact mold and removal of the cup, upon testing, the resultant cup will be found to have the strength of fiber filled polystyrene and multiaxial orientated polystyrene.

EXAMPLE II

Powdered cellulose acetate butyrate and randomly arrayed nylon fibers are co-fed into a compression mold of a dimension equal to a slug. The mass is heated above the softening point of the cellulose acetate butyrate but below that of the nylon fibers and then compressed into a slug.

The slug is then deposited into impact mold apparatus such as shown in FIG. 2 and subject to an impact stroke while the male die is rotated with a level of torque sufficient to cause rotation after the mold cavity is filled but is insufficient to prevent solidification of the cellulose acetate butyrate as the mold block cools.

Upon opening of the mold, removal of the formed cup and inspection, it is found that an extremely high strength structure having all the attributes of oriented fiber filled plastic of oriented molecule is obtained.

EXAMPLE III

A stacked multiphase sheet of polyvinylidene chloride, of styrene-acrylonitrile copolymer as the outer layers and a thick sheet of foamed polystyrene are laminated together using heat and compression as the adhering means. Hexagonal shaped slugs of small size are then stamped out of said sheet.

Figure 1:
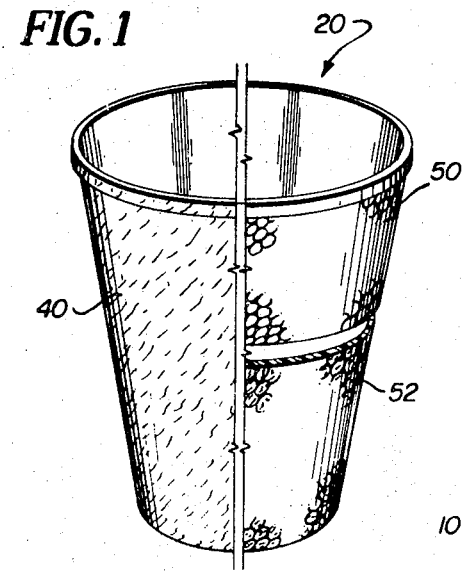
FIG. 1 is a perspective view of a cup formed in accordance with the novel process of this invention.

A plurality of such slugs are then heated to about 250° F. and deposited onto the mold block of impact mold apparatus such as shown in FIG. 1. The slugs are then impact molded using a torque of sufficient scope to cause continued rotation past the complete formation of the cup but insufficient to prevent solidification of the plastic of the slugs utilized.

Upon removal of the cup from the impact mold, it is found, upon test, that a unique structure has been formed. The slugs are flattened and spread in interleaf fashion through the wall thickness of the cup. Also an orientation in a helical pattern appears. The three plastics utilized are interleafed and helically wound from the center of the base of the cup, around the outside to the rim. The characteristics of each plastic is evident in the final product.

EXAMPLE IV

Slugs similar to that of Example III but with parallel arrays of short length fiber glass interleaved between the three plastics is made as in Example III. Then the formed slugs are impact molded into a cup.

The finished cup possesses even greater strength than the cup of Example III probably because of the fiber therein. In addition, it possesses the characteristics of each plastic. And uniquely, the length of the fiber glass incorporated within the several layers of plastic comprising each slug is almost the same. They evidently are not adversely affected by the shear of the apparatus employed.

Figure 4:
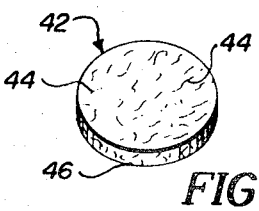
FIG. 4 is a perspective view of an embodiment of slugs useful in the method of this invention.
Figure 5:
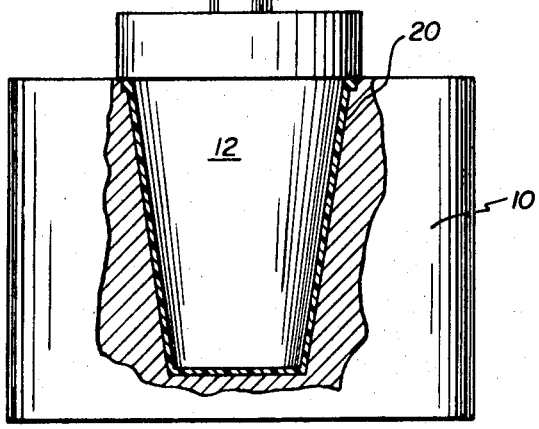
FIG. 5 is a perspective view of another embodiment of such slugs.
Figure 5:
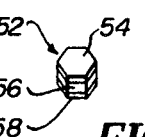

FIG. 1 illustrates a composite cup of the several examples above. The left hand side 40 of the cup shown illustrates the product of Examples I and II wherein a single slug 42, such as shown in FIG. 4, was utilized. The slug 42, as shown, is formed of plastic 44 with fiber 46 of short length randomly dispersed therein. The upper right hand side 50 of the cup 20 in FIG. 1 illustrates the product of Example III wherein a plurality of slugs 52 (one shown in FIG. 5) of stacked multiphase plastic was used. The slug 52, as illustrated, is a laminate of three layers 54, 56 and 58 of dissimilar plastic. Obviously additional layers of similar or dissimilar plastic could be used.

The lower right hand side 60 illustrates the product of Example IV wherein a plurality of slugs of stacked multiphase as well as fiber glass plastic was used. The structure of the slug is actually a combination of slugs 42 and 52.

The raw plastic that can be utilized in the process of this invention can be most any plastic capable of being softened by heat so that it can be impact molded, such as acrylonitrile-butadiene-styrene, polyacetal, the acrylates, the allyl resins, cellulose acetate, cellulose propionate cellulose acetate butyrate, chlorinated polyether, the fluoroplastics including polytetrafluoroethylene, the nylons, the polyacrylic esters, the polycarbonates, the polyesters, polyethylene, polypropylene, polystyrene, styrene-acrylonitrile copolymers, the urethanes, the vinyl polymers including vinyl butyral, vinyl chloride, vinyl chloride-acetate, vinylidene chloride, vinyl formal and polyvinyl dichloride and similar resins.

As to the fibers and/or filler that may be used, they may comprise a cellulose, asbestos, boron fibers, fibrous copper, cotton flock, ethylene copolymers, macerated fabric, glass fiber and flake, synthetic plastic fiber including nylon, polypropylene, polytetrafluoro-ethylene, cellulose acetate, jute, keratin, lignin, mica, sisal, fibrous wood and the like.

It should also be evident that any article possessing some form of rotational symmetry can be molded with the method of this invention, such as shot shell wads or bases, or cups or parisons, or semi-spheres and the like. And, with respect to the apparatus, that shown in the drawings can be made to constitute part of a production apparatus or a pilot lab apparatus, as desired.

While the above description and examples emphasize the use of apparatus and a method wherein one mold element rotates or oscillates or rotates and oscillates during the impact mold operation, it is also contemplated that the rotation or oscillation be eliminated. This impact molding would be performed with no orientation of the molecules of the plastic or of the filler, other than in the normal flow direction.

It will thus be seen that the objects set forth above, among those made apparent from the preceding description, are efficiently attained and, since certain changes may be made in carrying out the above process, and in the described product, without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. An article impact molded from a plurality of multiphase thermoplastic slugs, said slugs being flattened and spread in interleafed fashion through the wall of said article.

2. The impact molded article of claim 1 wherein the molecules of said plastic are orientated generally in a helical pattern.

3. The impact molded article of claim 2 wherein said article comprises filler containing plastic, said filler being arranged in a helical pattern arrangement through the wall of the article.

References Cited
UNITED STATES PATENTS

| | | | |
|---|---|---|---|
| 2,838,802 | 6/1958 | Reynolds | 264—122 |
| 2,987,775 | 6/1961 | Albrecht | 264—323 |
| 3,030,668 | 4/1962 | Taylor | 264—311 |
| 3,063,883 | 11/1962 | Brissette | 264—122 |
| 3,075,249 | 1/1963 | Sucher | 264—255 |
| 3,141,811 | 7/1964 | Fox et al. | 161—93 |
| 3,192,569 | 7/1965 | Knabel | 264—323 |
| 3,210,230 | 10/1965 | Tyhurst | 264—309 |
| 3,223,761 | 12/1965 | Daley | 264—171 |
| 3,307,726 | 3/1967 | Cleereman | 161—55 |

WILLIAM J. VAN BALEN, Primary Examiner

U.S. Cl. X.R.

161—168, 402; 264—122, 171, 255